United States Patent [19]

Kogure

[11] Patent Number: 5,027,875

[45] Date of Patent: Jul. 2, 1991

[54] PNEUMATIC TIRE HAVING REDUCED TREAD PATTERN NOISE

[75] Inventor: Tomohiko Kogure, Ashigara, Japan

[73] Assignee: The Yokohama Rubber Co., Ltd., Tokyo, Japan

[21] Appl. No.: 350,661

[22] Filed: May 9, 1989

[30] Foreign Application Priority Data

May 11, 1988 [JP] Japan .................................. 63-112543

[51] Int. Cl.⁵ ............................................ B60C 11/03
[52] U.S. Cl. ............................................... 152/209 R
[58] Field of Search ........... 152/209 R, 209 A, 209 D

[56] References Cited

U.S. PATENT DOCUMENTS 4,351,381 9/1982 Roberts et al. ................. 152/209 R
4,823,855 4/1989 Goergen et al. ................ 152/209 R Primary Examiner—Michael W. Ball
Assistant Examiner—Geoffrey L. Knable
Attorney, Agent, or Firm—Armstrong, Nikaido, Marmelstein, Kubovcik, & Murray

[57] ABSTRACT

A pneumatic tire wherein the shoulder width of a pitch having a larger length is smaller than that of a pitch having a smaller length and there exists a particular relationship between the length ratio $\alpha$ of the longest pitch to the shortest pitch and the ratio $\beta$ of the maximum value of $P_i \times L_i$ to the minimum value of $P_i \times L_i$.

3 Claims, 4 Drawing Sheets

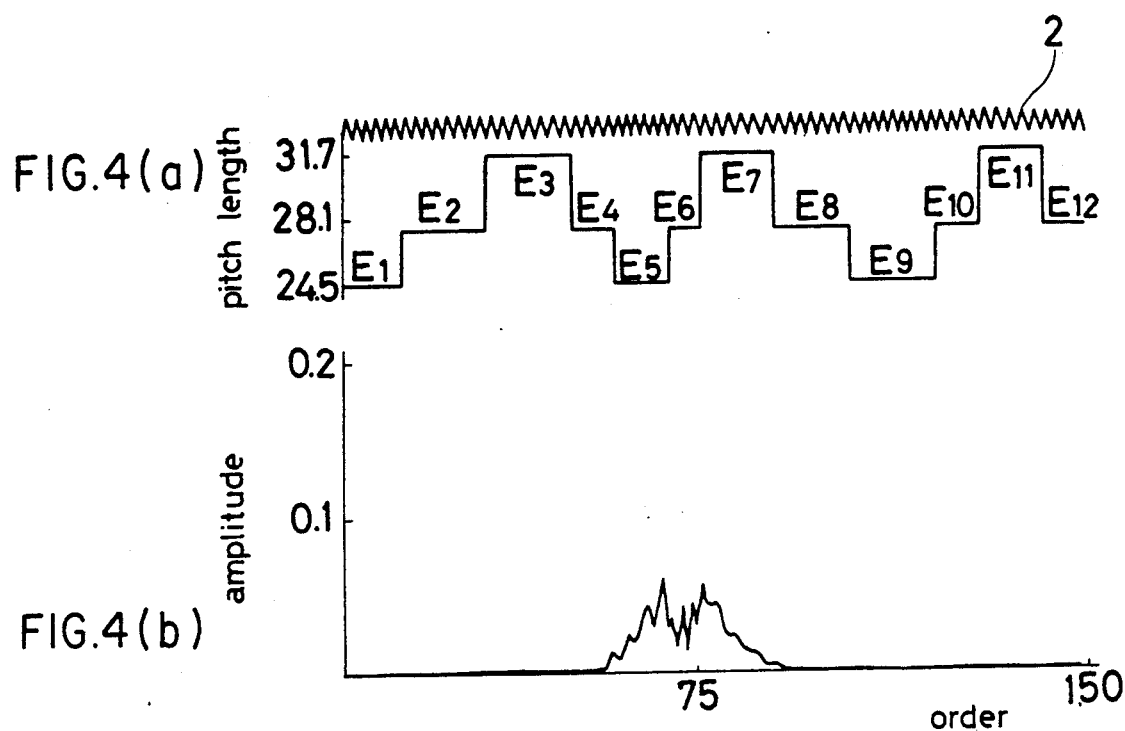
FIG.4(a)
FIG.4(b)
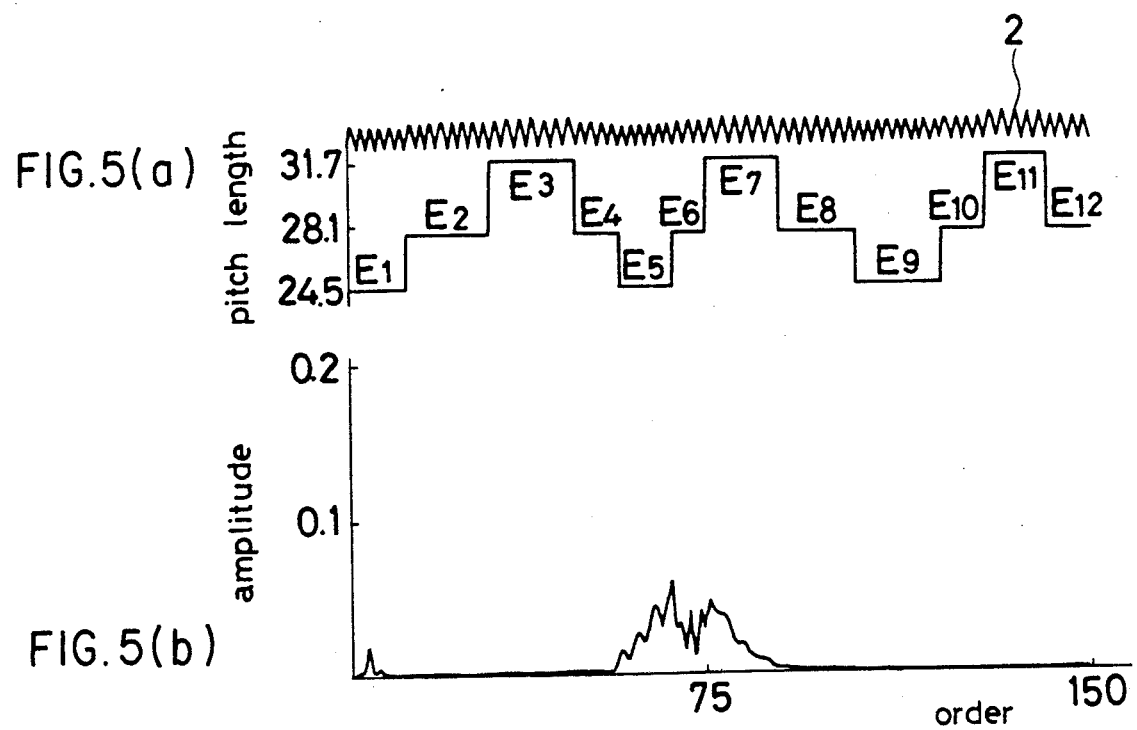
FIG.5(a)
FIG.5(b)

PNEUMATIC TIRE HAVING REDUCED TREAD PATTERN NOISE

BACKGROUND OF THE INVENTION

The present invention relates to a pneumatic tire with a plurality of tread design elements different from each other in the pitch length and provided on the shoulder part of the tread surface in the circumferential direction of the tire which enables a reduction in the noise (pattern noise) caused by the tread design element accompanying rolling of the tire.

In order to reduce the pattern noise, a proposal has been made in the art on dispersion of the pattern noise in a wide frequency range (a frequency dependent upon the product of the number of revolutions of the tire and that of tread design elements) around the pitch frequency to make the noise inconspicuous. This method is called a variable pitch arrangement. In this method, several kinds of tread design elements (i.e., pitches) different from each other in the pitch length are properly provided in the circumferential direction of the tire so that the time intervals of a pulsatory noise or vibration caused when each tread design element is brought into contact with the ground surface is changed, thereby preventing the noise from concentrating on a particular frequency.

This method is based on frequency modulation theory employed in, for example, ratio engineering. However, in this method, no sufficient reduction in the pattern noise can be attained.

The present inventors have made studies with a view to reducing the pattern noise and, as a result, have found that the pulsation of the sound pressure level must not be overlooked as a factor which worsens the impression of the tire noise. Specifically, when the conventional sound level measuring method wherein a sound level is expressed in terms of an average value in a given period of time provides the same sound level, the auditory feeling of the human being frequently finds a difference in the sound level. The present inventors have searched for the cause of the above-described phenomenon and, as a result, have found that this phenomenon is attributable to a difference between the sound pressure level which greatly pulsates in a frequency range as low as about 10 Hz or less and the sound pressure level which does not pulsate in such a frequency range. The pulsation of the sound level, i.e., the pulsation which is one of the main causes of the noise, can be determined by outputting the change in the sound pressure level with time through reproduction at a low speed of the noise recorded at a high speed. For example, the pulsation can be determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

In the theory of the conventional tread design element arrangement with respect to the sound pressure level, it is a common practice to simulate the dispersion on a frequency axis through Fourier expansion of a sine wave train generated at the same time intervals as the order of arrangement of the tread design elements in one turn of the tire, assuming that one sine wave is generated from one tread design element. In particular, various studies and proposals have been made on a theoretical analysis in such an arrangement that the pitches are successively arranged from a short pitch to a long pitch and again to a short pitch, thereby changing the pitch length in a sine wave form (see, e.g., Jidosha Gijutsu, Vol. 28, No. 1, 1974 "Taiya Noizu ni Tsuite", and Japanese Patent Application Kokai Publication No. 54-115801). In these observations, no discussion is made on the pulsation of the above-described sound pressure level because the observation is made assuming that the magnitude of the vibration generated from each tread design element is constant.

The present inventors have noted that a large circumferential length of the tread design element gives rise to a large level of a vibration generated from the element and have tried a theoretical calculation under the following assumption. That is, Fourier expansion has been made assuming that the vibration generated from each tread design element is a sine wave wherein the amplitude is increased in proportion to the circumferential length of the tread design element. As a result, it has been found that, as is apparent from FIGS. 4(a) and (b) and FIGS. 5(a) and (b), when assuming that sine waves having an equal magnitude are generated from each tread design element according to the conventional calculation method, no amplitude appears in a low frequency range as shown in FIG. 4(b), while when assuming that there occurs a sine wave having an amplitude corresponding to the pitch length of the tread design element, a vibration peak appears in a low frequency range corresponding to a particular periodicity of the tread design element arrangement as shown in FIG. 5(b). In particular, when the arrangement of the tread design elements is regular, the peak in this low frequency range becomes significant, which enhances the pulsation of the sound pressure level, so that the impression of the noise is worsened.

FIGS. 4(a) and 5(a) are respectively explanatory views of pitch arrangements (tread design element arrangements). Numeral 2 designates a vibration wave form. FIG. 4(b) and FIG. 5(b) are each a graph showing the relationship between the order in the Fourier analysis and the amplitude corresponding to that order. In FIG. 4(a) and FIG. 5(a), the length of pitch A is 31.7 mm, that of pitch B is 27.5 mm and that of pitch C is 24.5 mm, and pitch group $E_1$ refers to a sequence of C C C C C C, pitch group $E_2$ refers to a sequence of B B B B B B B B, pitch group $E_3$ refers to a sequence of A A A A A A A, pitch group $E_4$ refers to a sequence of B B B B, pitch group $E_5$ refers to a sequence of C C C C C C, pitch group $E_6$ refers to a sequence of B B B, pitch group $E_7$ refers to a sequence of A A A A A A, pitch group $E_8$ refers to a sequence of B B B B B B B, pitch group $E_9$ refers to a sequence of C C C C C C C C C, pitch group $E_{10}$ refers to a sequence of B B B B, pitch group $E_{11}$ refers to a sequence of A A A A A, and pitch group $E_{12}$ refers to a sequence of B B B B. The pitch arrangement shown in FIG. 4(a) is the same as that shown in FIG. 5(a). The term "pitch" used herein is intended to mean one of similar minimum units of a repeating pattern for constituting a tire tread design comprising a continuous repeating pattern provided in the circumferential direction of the tire. The term "pitch group" is intended to mean a portion wherein a plurality of the identical pitches among the pitches are arranged in sequence.

SUMMARY OF THE INVENTION

An object of the present invention is to provide a pneumatic tire improved in the habitability and comfort of an automobile by virtue of a combination of a reduction in the pulsation of the sound pressure level through an improvement in the constitution and arrangement of the pitch with a reduction in the pattern noise through equalization of the rigidity of the tread design elements provided on the shoulder parts along the whole circumference of the tire.

In order to attain the above-described objects, the present invention provides a pneumatic tire having annular circumferential grooves provided on each shoulder part, wherein the shoulder width of a pitch having a larger length is smaller than that of a pitch having a smaller length and when the length ratio of the longest pitch to the shortest pitch and the ratio of the maximum value of $P_i \times L_i$ wherein $P_i$ is pitch length (i=1, 2, 3 ...) and $L_i$ is shoulder width (i=1, 2, 3 ...) to the minimum value of $P_i \times L_i$ are assumed to be $\alpha$ and $\beta$, respectively, the following relationship is satisfied:

$$\beta + (\alpha - 1) \times k + 1$$

wherein
k is 0 to 0.7 when $\alpha$ is 1.2 to 1.6 and
k is 0.20 to 0.7 when $\alpha$ is 1.6 to 2.0

BRIEF DESCRIPTION OF THE DRAWINGS

FIGS. 4(a) and FIG. 5(a) are each an explanatory view of a pitch arrangement; and FIGS. 4(b) and FIG. 5(b) are each a graph showing the relationship between the order in Fourier analysis and the amplitude corresponding to that order.

DETAILED DESCRIPTION OF THE PREFERRED EMBODIMENTS (1) A first characteristic feature of the present invention resides in that in a pneumatic tire having annular circumferential grooves provided on each shoulder part, the shoulder width of a pitch having a larger length is smaller than that of a pitch having a smaller length.

The term "shoulder width" is intended to mean the distance from the center of the circumferential groove (shoulder groove) to the ground-contacting edge in the widthwise direction of the tire. The term "pitch length" is intended to mean the length of the pitch in the circumferential direction of the tire.

As is apparent from the results of the above-described theoretical calculation, no low-frequency pulsation occurs when the amplitude of the sine wave generated from each pitch is constant irrespective of the pitch length. Therefore, it is necessary to equalize the rigidity of the tread design element with each other.

Studies conducted by the present inventors have revealed that the shoulder part and the size (area) of the tread design element surrounded by grooves greatly influence the pulsation of the noise. For this reason, it is necessary that the size of the pitch be constant irrespective of the pitch length. This requirement can be satisfied when the size of each tread design element, i.e., the product of pitch length and shoulder width, is constant. Accordingly, in the present invention, the shoulder width of a pitch having a larger length is adjusted to be smaller than that of a pitch having a smaller length.

(2) A second characteristic feature of the present invention resides in that when the length ratio of the longest pitch to the shortest pitch and the ratio of the maximum value of $P_i \times L_i$ wherein $P_i$ is pitch length (i=1, 2, 3 ...) and $L_i$ is shoulder width (i=1, 2, 3 ...) to the minimum value of $P_i \times L_i$ are assumed to be $\alpha$ and $\beta$, respectively, the following relationship is satisfied:

$$\beta = (\alpha - 1) \times k + 1$$

wherein,
k is 0 to 0.7 when a is 1.2 to 1.6 and
k is 0.20 to 0.7 when $\alpha$ is 1.6 to 2.0

Figure 1:
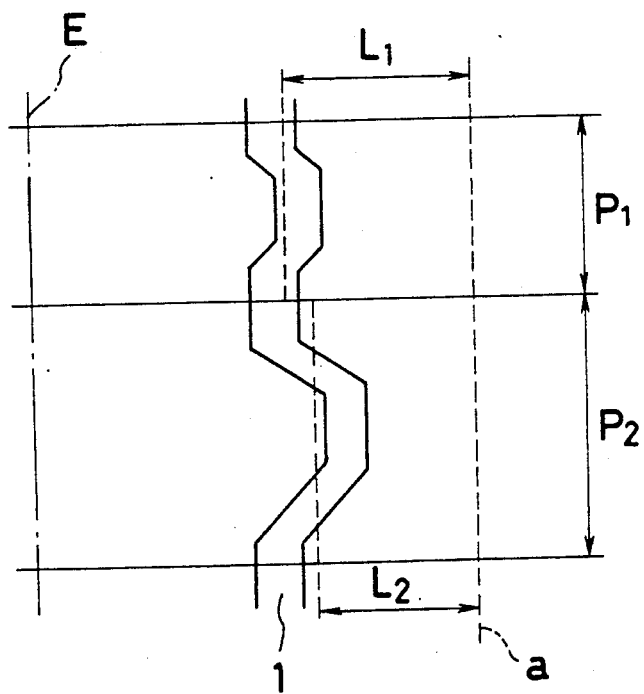
FIG. 1 is an explanatory plan view of part of a shoulder part of an example of a pneumatic tire according to the present invention.

FIG. 1 is an explanatory plan view of part of a shoulder part of an example of a pneumatic tire according to the present invention. A ground-contacting edge a refers to one in the case where a predetermined internal pressure is applied to the tire under JIS standard conditions. In FIG. 1, an annular circumferential groove 1 is provided in the shoulder part. E represents the center line in the central part in the widthwise direction of the tire. The pitch length $P_2$ is larger than the pitch length $P_1$.

In FIG. 1, in order to equalize the rigidity of each pitch of the shoulder part, the position of the circumferential groove 1 in the widthwise direction of the tire, i.e., the shoulder width, with respect to the pitch having a larger length $P_2$ is shifted towards the shoulder edge (towards the ground-contacting edge a) as compared with that of the pitch having a smaller pitch length $P_1$. That is, the shoulder width $L_2$ is smaller than the shoulder width $L_1$ ($L_2$, $L_1$: average value in each pitch). Consequently, the pitch having a larger pitch length has a smaller shoulder width $L_2$ than that of the pitch having a smaller pitch length. This reduces the difference in the fundamental dimension $P_i \times L_i$ between the pitches. The position of the circumferential groove 1 in the widthwise direction of the tire which determines each shoulder width corresponds to the average value of the distance from the ground-contacting edge to the center of said groove in the widthwise direction of the tire. The alteration of the position of the circumferential groove 1 according to the pitch length equalizes the rigidity of the pitch of the shoulder part on the periphery of the tire, which contributes to a reduction in the pulsation of the noise. When the ratio of the maximum value of $P_i \times L_i$ to the minimum value of $P_i \times L_i$ is assumed to be $\beta$, the $\beta$ value is the same as the ratio of the maximum pitch length to the minimum pitch length, i.e., usually 1.2 to 1.6, if the $L_i$ value is constant as in the case of a conventional tread pattern. In the present invention, the $\beta$ value is 1.3 or less, preferably 1.0 to 1.25. On the other hand, in order to improve the dispersion of the noise in a wide frequency range, it is desirable to increase the ratio $\alpha$ of the maximum pitch length to the minimum pitch length. For this reason, it is preferred that the $\alpha$ value be increased and, at the same time, the $\beta$ value which is smaller than the $\alpha$ value be one represented by the following equation (a):

$$\beta = (\alpha - 1) \times k + 1 \qquad (a)$$

wherein k is 0 to 0.7 when $\alpha$ is 1.2 to 1.6.

Since the rigidity of the tread in the shoulder part can be further equalized by making the $\beta$ value smaller than the $\alpha$ value, the shoulder part becomes less susceptible to irregular abrasion as compared with the conventional tire. It is possible to increase the $\alpha$ value up to 2.0, and the increase in the $\alpha$ value brings about a further reduction in the noise. However, when the $\alpha$ value is excessively large ($\alpha > 1.6$), the average shoulder width of the shoulder part should be remarkably reduced, which brings about a problem of irregular abrasion of a large pitch. Therefore, in this case, the relationship represented by the following equation (b) should be satisfied:

$$\beta = (\alpha - 1) \times k + 1 \qquad (b)$$

wherein k is 0.20 to 0.7 when $\alpha$ is 1.6 to 2.0.

For the reasons set out above, in the present invention, the $\beta$ value is defined as follows:

$$\beta = (\alpha - 1) \times k + 1$$

wherein
k is 0 to 0.7 when $\alpha$ is 1.2 to 1.6 and
k is 0.20 to 0.7 when $\alpha$ is 1.6 to 2.0.

Figure 2:
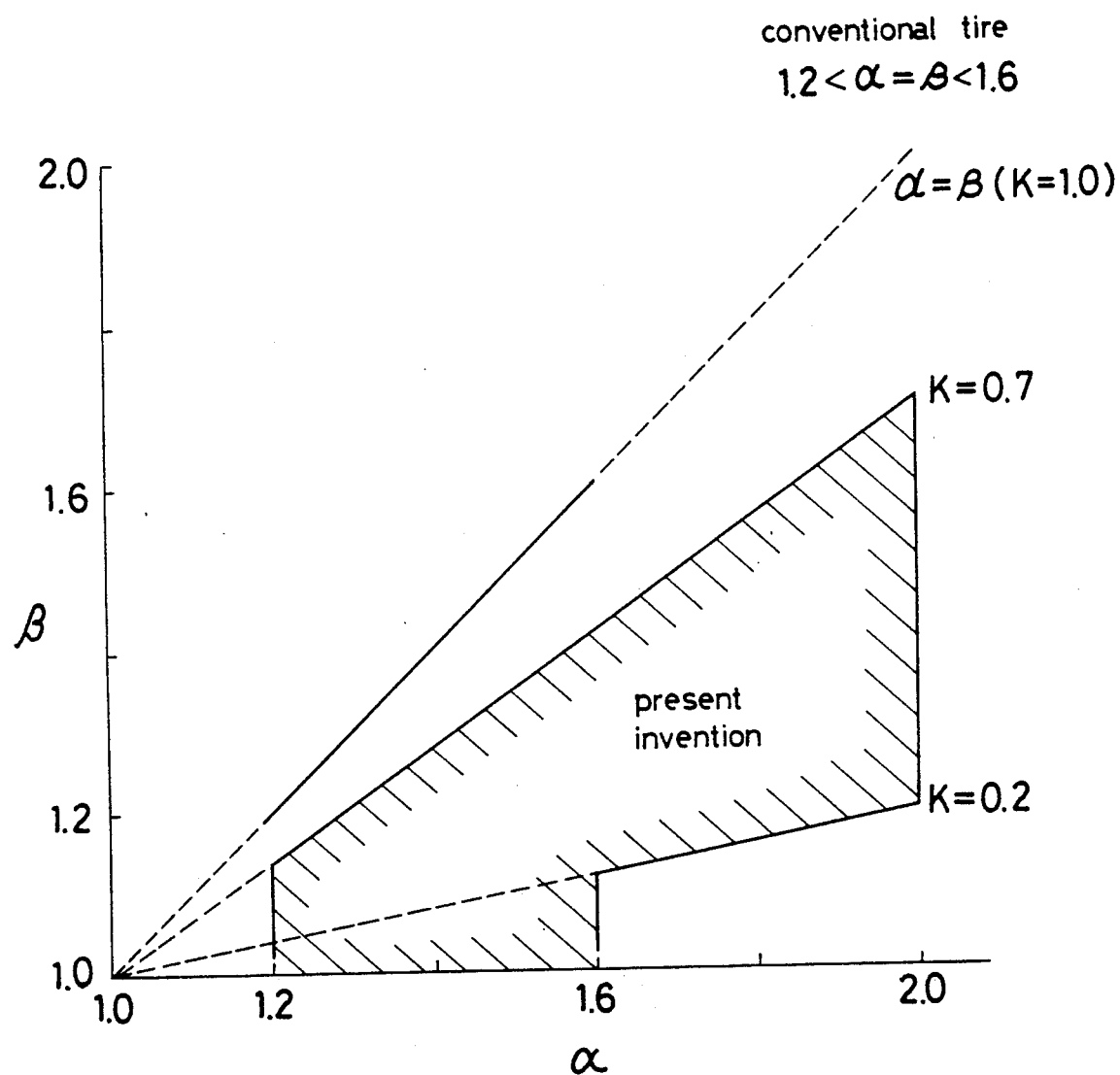
FIG. 2 is a graph showing the relationship between $\alpha$ and $\beta$ values.

The relationship between the $\alpha$ and $\beta$ values is shown in FIG. 2, wherein the hatched area represents the scope of the present invention.

The present invention will now be described in more detail with reference to the following Example.

EXAMPLE

Figure 3C:
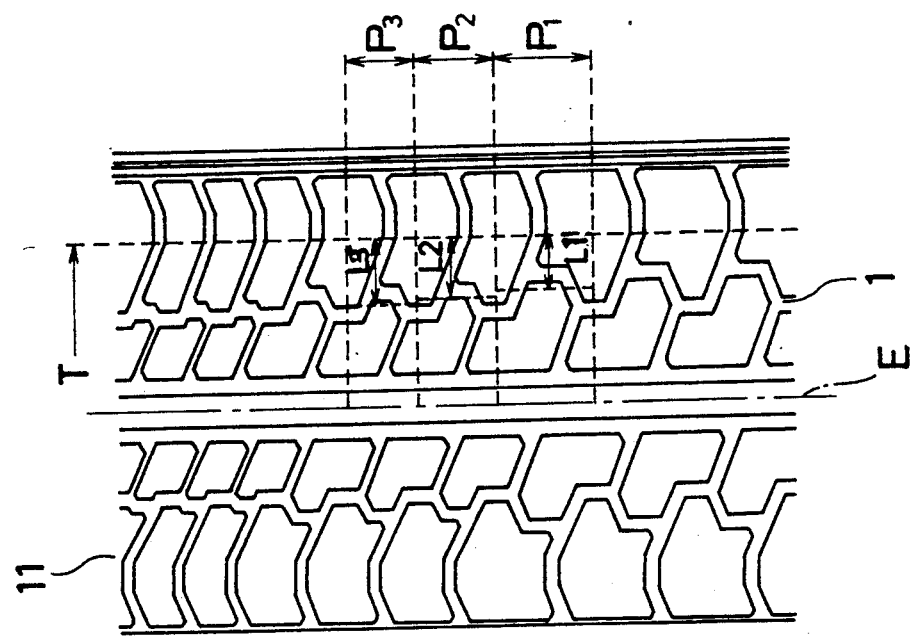
FIG. 3(C) is an enlarged explanatory view of part of the tread pattern shown in FIG. 3(B)
Figure 3B:
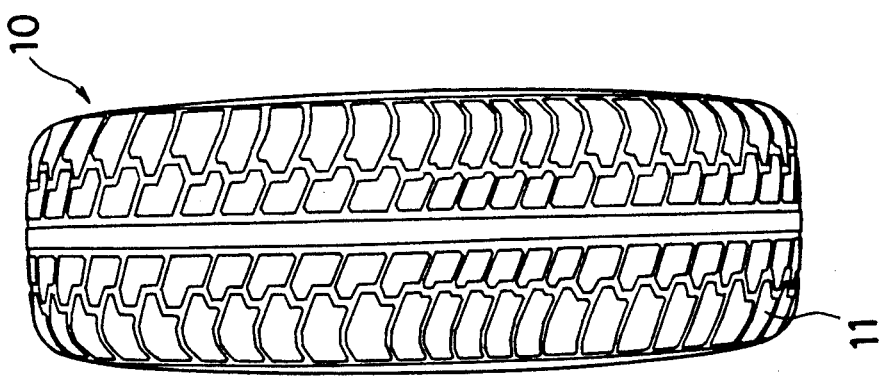
FIG. 3(B) is a plan view of a tread pattern provided on the tread surface of the tire shown in FIG. 3(A)
Figure 3A:
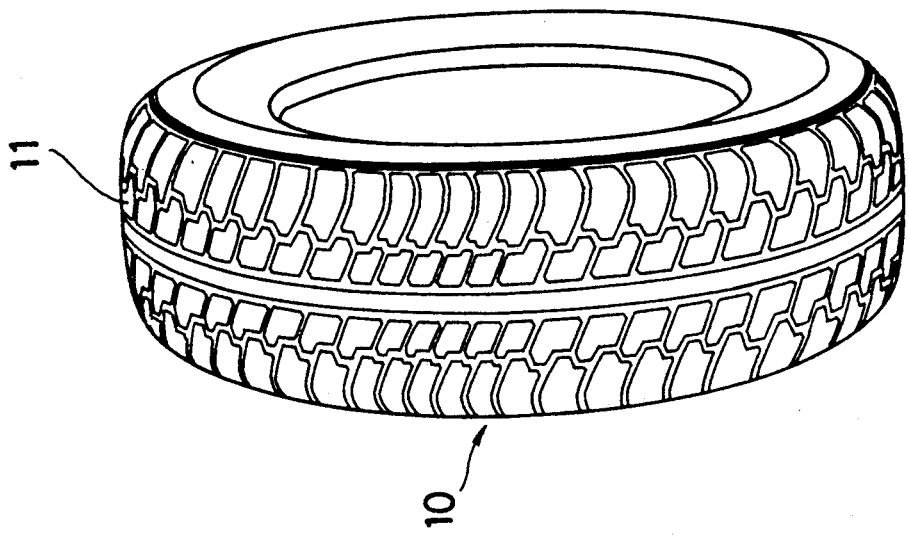
FIG. 3(A) is an exterior view of an example of a pneumatic tire according to the present invention.

FIG. 3(A) is an exterior view of an example of a pneumatic tire according to the present invention; FIG. 3(B) a plan view of a tread pattern provided on the tread surface of the tire shown in FIG. 3(A); and FIG. 3(C) an enlarged explanatory view of part of the tread pattern shown in FIG. 3(B). In these drawings, numeral 10 designates a tire and numeral 11 a tread pattern. In FIG. 3(C), T represents the ground-contacting width.

Pneumatic tires (tire of the present invention, conventional tire, and comparative tire) each having the above-described tread pattern and a size of 175/80 R13 were subjected to evaluation of noise pulsation (dB) and impression of the noise. The results are shown in Table 1.

EVALUATION METHOD OF NOISE PULSATION

The noise pulsation was determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

TABLE 1

|  | Pitch length mm | | | Shoulder width mm | | | $\alpha$ | $\beta$ | Noise pulsation (dB) | Impression of noise | Remarks on impression of noise |
|---|---|---|---|---|---|---|---|---|---|---|---|
|  | P1 | P2 | P3 | L1 | L2 | L3 | | | | | |
| Conventional tire | 31.7 | 27.5 | 24.5 | 20 | 20 | 20 | 1.29 | 1.29 | 5.0 | poor | impracticable due to large pulsation |
| Conventional tire 2 | 35.8 | 27.5 | 21.0 | 20 | 20 | 20 | 1.70 | 1.70 | 6.8 | poor | impracticable due to large pulsation in spite of reduced pitch noise |
| Tire 1 of the present invention | 31.7 | 27.5 | 24.5 | 19 | 20 | 21 | 1.29 | 1.17 | 3.7 | good | improved pulsation with no significant reduction in pitch noise |
| Comparative tire 1 | 35.8 | 27.5 | 21.0 | 19 | 20 | 21 | 1.70 | 1.54 | 5.5 | poor | impraticable due to large pulsation |
| Tire 2 of the present invention | 35.8 | 27.5 | 21.0 | 18 | 20 | 33 | 1.70 | 1.39 | 4.6 | good | practicable due to good impression by virtue of small pulsation with reduced pitch noise |
| Tire 3 of the present invention | 35.8 | 27.5 | 21.0 | 16 | 20 | 22 | 1.70 | 1.24 | 4.1 | good | best in reduction in both pitch noise and pulsation |

As is apparent from FIG. 1, in both the conventional tires 1 and 2, the shoulder width of the shoulder part is constant in each pitch, i.e., the $\alpha$ value is equal to the $\beta$ value. The large $\beta$ value brings about an insufficient reduction in the noise pulsation. By contrast, in tire 1 of the present invention, the shoulder width of the shoulder part of conventional tire 1 is reduced with an increase in the pitch length. That is, the $\beta$ value is smaller than 1.25, i.e., $\beta = (\alpha - 1) \times 0.59 + 1$, which contributes to a reduction in the pulsation. In comparative tire 1, the shoulder width of the shoulder part of conventional tire 2 is slightly reduced with an increase in the pitch length. That is, the $\beta$ value is larger than 1.25, i.e., $\beta = (\alpha - 1) \times 0.77 + 1$. Although the pitch noise is reduced by virtue of an increase in the $\alpha$ value, no reduction in the pulsation is observed. In tire 2 of the present invention, compared with comparative tire 1, the shoulder width of the pitch having a larger length is further reduced and the shoulder width of the pitch having a smaller length is increased. Specifically, although the $\beta$ value is $(\alpha - 1) \times 0.56 + 1$, i.e., slightly large, the $\alpha$ value is large. Therefore, this causes the pitch noise to be dispersed, which contributes a comparable reduction in the pulsation. This renders the tire practicable from the viewpoint of the impression of noise. Tire 3 of the present invention has a further reduced shoulder width of the pitch having a larger pitch length, i.e., a further reduced $\beta$ value, and exhibits the best results.

As described above, according to the present invention, the rigidity of the shoulder part which greatly influences the pulsation is equalized on the periphery of the tire by making the $\beta$ value determined by the product of the pitch length and the shoulder width smaller than that of the conventional tire, which makes it possible to reduce the pulsation of the noise. The present invention is suitable particularly as a pneumatic tire for a passenger car.

What is claimed is:

1. A pneumatic tire having a treat surface pattern constituted by a plurality of treat design elements which include an annular circumferential shoulder groove and tread design elements having a pitch length different from other ones of said design elements which extend circumferentially around said tire at each shoulder part of the tire, pitch meaning one of similar minimum units of a repeating pattern providing said tread surface pattern, a distance from a center of the circumferential groove to a ground-contacting edge of each tread surface design element in a shoulder part of said tire having a larger pitch length is smaller than a distance from a center of the circumferential groove to a ground-contacting edge of each tread surface design element having a smaller pitch length in that shoulder part of the tire, a ratio of the length of a tread surface design element having the largest pitch length to a length of a design element having the shortest pitch length is $\alpha$; $\beta$ is a ratio of the maximum value of $P_i \times L_i$ to the minimum value of $P_i \times L_i$, where $P_i$ is the pitch length of a design element ($i=1, 2, 3, \ldots$) and $L_i$ is the distance from a center of said circumferential shoulder groove to a ground-contacting edge of a design element ($i=1, 2, 3, \ldots$), $\alpha$ is 1.2 to 2.0, and the following relationship:

$$\beta = (\alpha - 1) \times K + 1,$$

is satisfied by:
 $0 \leq K \leq 0.7$ when $\alpha$ is 1.2 to 1.6, and
 $0.20 \leq K \leq 0.7$ when $\alpha$ is 1.6 to 2.0.

2. A pneumatic tire according to claim 3, wherein $\beta$ is 1.0 to 1.25

3. A pneumatic passenger car tire having a tread surface pattern constituted by a plurality of tread design elements which include an annular circumferential shoulder groove and tread design elements having a pitch length different from other ones of said design elements which extend circumferentially around said tire at each shoulder part of the tire, pitch meaning one of similar minimum units of a repeating pattern providing said tread surface pattern, a distance from a center of the circumferential groove to a ground-contacting edge of each tread surface design element in a shoulder part of said tire having a larger pitch length is smaller than a distance from a center of the circumferential groove to a ground-contacting edge of each tread surface design element having a smaller pitch length in that shoulder part of the tire, a ratio of the length of a tread surface design element having the largest pitch length to a length of a design element having the shortest pitch length is $\alpha$; $\beta$ is a ratio of the maximum valve of $P_i \times L_i$ to the minimum value of $P_i \times L_i$, where $P_i$ is the pitch length of a design element ($i=1, 2, 3, \ldots$) and $L_1$ is the distance from a center of said circumferential shoulder groove to a ground-contacting edge of a design element ($i=1, 2, 3 \ldots$), $\alpha$ is 1.2 to 2.0, and the following relationship:

$$\beta = (\alpha - 1) \times K + 1,$$

is satisfied by:
 $0 \leq K \leq 0.7$ when $\alpha$ is 1.2 to 1.6, and
 $0.20 \leq K \leq 0.7$ when $\alpha$ is 1.6 to 2.0.

* * * * *